Patented Feb. 6, 1934

1,946,077

UNITED STATES PATENT OFFICE 1,946,077

METHOD OF PRODUCING POROUS GYPSUM PRODUCTS

Hans O. Kauffmann, Buffalo, N. Y., assignor to Buffalo Electro-Chemical Co. Inc., Buffalo, N. Y.

No Drawing. Application September 15, 1932 Serial No. 633,385

11 Claims. (Cl. 106—34)

This invention relates to methods of preparing vesicular building materials prepared from cementitious mixes which possess the property of hardening by setting or crystallizing.

Heretofore, it has been proposed to prepare porous building material from stucco by liberating gases such as hydrogen or carbon dioxide by chemical reaction but the products so produced possessed the disadvantage of irregularity of structure and nonhomogeneity of cellules which induces a weakness in the product, and further the introduction of substantially large quantities of noncementitious or non-hardening chemicals, also militates against the use of such materials.

It has further been suggested to use hydrogen peroxide as a source of gas producing the cellular structure so desired in building materials of this type but the difficulty of producing uniform decomposition of the peroxide and evolution of oxygen has hindered the wide acceptance and use of this method.

The present invention provides a method for producing vesicular building materials from cementitious mixes which are adapted to set and harden by the use of extremely minute quantities of harmless addition materials; to produce a vesicular building product characterized by minute and uniformly distributed cellules distributed throughout the product and therefore possessing uniform strength at all points. The invention further provides a method for liberating oxygen from hydrogen peroxide uniformly when the peroxide is mixed with cementitious materials, a method wherein a certain period of induction is provided between the mixture of the oxygen liberating material with the hydrogen peroxide which permits of a uniform mixture and distribution of the substances prior to its setting or hardening, and a method wherein oxygen is liberated from hydrogen peroxide admixed with cementitious mixes prior to the setting or hardening of the mix.

In producing vesicular building products, therefore, in accordance with the method of my invention, I incorporate a potentially active peroxide decomposing agent in a mix of cementitious materials and after distributing the catalytic agent uniformly throughout the mix so treat the agent as to increase the activity thereof to a degree at which the agent will actively decompose the hydrogen peroxide. Further, I have found it is possible to regulate the activation of the catalytic agent in such fashion as to increase or decrease the so-called induction period, that is, the period of time elapsing between the addition of materials activating the catalyst and the period at which active evolution of oxygen occurs from the peroxide.

As potential peroxide decomposing compounds, I propose to incorporate salts of polyvalent metals which are soluble in the mix, and have found that salts of manganese, iron, copper, nickel, cobalt, etc., may be used in this connection.

After distributing these potentially active peroxide decomposing agents or catalysts in the mix, they may be rendered active by changing their chemical and physical nature whereby finely divided colloidal or pseudo-colloidal oxides or hydrated oxides of such metals are produced. I have found that such physical and chemical change may be induced in the potentially active catalyst by adding an alkaline reagent to the bath and prefer to use soda, caustic soda, or potash or ammonia or other suitable alkali capable of changing these baths to the oxide or hydrated oxide form.

As an example the following mix may be mentioned as containing suitable proportions of ingredients for the preparation of a vesicular product suitable for acoustical and insulation purposes:

Example 1

1880 ccs. Water of not too great hardness and not too high iron content,
0.1 gs. Manganous chloride,
0.5 gs. Soft soap, and
30 ccs. Hydrogen peroxide 100 volume,
are mixed together. 3000 gs. plaster $(CaSO_4 \cdot \tfrac{1}{2}H_2O)$ are added to the above mixture until a homogeneous mass is obtained. To this mass 1 cc. of a 10% caustic soda solution is added and after uniform agitation the entire mass is poured into the mold. After 1½ minutes the decomposition of peroxide ceases and after approximately 10 more minutes the plaster is set. Then after 15 minutes the material can be taken out of the mold and will dry in the usual time by well known methods.

The mold is a square 30×30 cms.; the height of the material resulting from the above described experiment was 6.8 cms.; the height of the above quantity of plaster set without the use of hydrogen peroxide is 3.3 cms. The volume of plain plaster without the use of hydrogen peroxide in this case will be 2,970 ccs., in the case of porous gypsum, as described above, 6.120 ccs. The porous gypsum has practically double the volume of the plaster which indicates that 100% of the hydrogen peroxide 100 vol. is decomposed and all the developed oxygen retained in the material.

Example 2

By increasing the quantity of the peroxide, larger vesicules are produced in the set material with of course a sacrifice in strength of the product. Thus by using 50 ccs. of hydrogen peroxide 100 volume, 1300 ccs. water, 0.5 gs. soft soap and 0.1 gs. manganous chloride with 2000 gs. plaster and alkalinating with 5 ccs. of commercial concentrated ammonia solution with stirring a cast is produced in the 30×30 cm. mold of 8.2 cms. in height in contrast to a cast of 2.2 cms. in height when no hydrogen peroxide is used. That is 2000 gms. of the plaster produces a normal cast of 1980 ccs. while the vesicular cast has a volume of 7380 ccs.

Example 3

By using the quantities of material as specified in Example 2, with 10 ccs. of a 2% copper sulfate solution instead of the manganese salt a cellular cast was obtained of 2430 ccs. in volume. The texture of this material was finer and the vesicules smaller than in the product obtained in either Example 1 or 2.

Example 4

1800 ccs. Water
0.5 gs. Soft soap
0.5 gs. Cobalt chloride (CoCl$_2$.6H$_2$O)
30 ccs. 100 volume hydrogen peroxide were mixed together, and
3000 gs. of plaster added and stirred uniformly to produce a slurry.

The catalyst was activated by distributing 10 ccs. of a 10% caustic soda solution throughout the mass before the plaster obtained its initial set, and the mix thereafter poured into the mold. The height of the cast was 6.2 cms. with a volume of 5580 ccs. or 90% larger than the cast with straight gypsum.

It will be seen from the foregoing that a method is provided for producing a uniform distribution of a potentially active peroxide catalyst throughout a mass of cementitious material that can be activated by changing the chemical and physical state of the catalyst to decompose the peroxide in the mix uniformly and produce a regulated vesicular structure in the mix and the set end product.

What is claimed is:

1. The process of producing cellular building products which comprises incorporating a quantity of a peroxide with a mix of cementitious material and water, distributing a potentially active catalytic peroxide decomposing agent in the mix, and thereafter rendering the catalytic agent active whereby the peroxide is decomposed and oxygen evolved uniformly throughout the mix.

2. The process of producing cellular building products which comprises incorporating a quantity of a peroxide with a cementitious mix, distributing a potentially active catalytic peroxide decomposing agent comprising a salt of a polyvalent metal in the mix, and thereafter rendering the catalytic agent active whereby the peroxide is decomposed and oxygen evolved uniformly throughout the mix.

3. The process of producing cellular building products from a cementitious mix containing water which comprises incorporating a quantity of a peroxide with the mix, distributing a potentially active catalytic peroxide decomposing agent comprising a water soluble salt of a polyvalent metal in the mix, and thereafter rendering the catalytic agent active whereby the peroxide is decomposed and oxygen evolved uniformly throughout the mix.

4. The process of producing cellular building products from a cementitious mix containing water, which comprises incorporating a quantity of peroxide with the mix, distributing a potentially active catalytic peroxide decomposing agent comprising a water soluble salt of a polyvalent metal in the mix, and rendering the catalytic agent active prior to the initial set of the cementitious material of the mix whereby the peroxide is decomposed and oxygen evolved uniformly throughout the mix producing cellules therein, that remain in the material during and after the setting thereof.

5. The process of producing cellular building products from a cementitious mix containing water, which comprises incorporating a quantity of a peroxide with the mix, distributing a potentially active catalytic peroxide decomposing agent comprising a water soluble metallic salt in the mix, and rendering the catalytic agent active prior to the initial set of the cementitious material of the mix by changing the metal of the salt to a colloidal suspension of an hydrated oxide whereby the peroxide is decomposed and oxygen evolved uniformly throughout the mix producing cellules therein that remain in the material during and after the setting thereof.

6. The process of producing cellular building products from a cementitious mix containing water, which comprises incorporating a quantity of a peroxide with the mix, distributing a quantity of a water soluble manganese salt in the mix, thereafter changing the salt to a colloidal suspension of an hydrated oxide of manganese prior to the initial set of the cementitious material of the mix, whereby the peroxide is decomposed and oxygen evolved uniformly throughout the mix producing cellules therein that remain in the material during and after the setting thereof.

7. The process of producing cellular building products from a cementitious mix containing water, which comprises incorporating a quantity of a peroxide with the mix, distributing a quantity of a water soluble cobalt salt in the mix, thereafter changing the salt to a colloidal suspension of an hydrated oxide of cobalt prior to the initial set of the cementitious material of the mix, whereby the peroxide is decomposed and oxygen evolved uniformly throughout the mix producing cellules therein that remain in the material during and after the setting thereof.

8. The process of producing cellular building products from a cementitious mix containing water, which comprises incorporating a quantity of a peroxide with the mix, distributing a quantity of a water soluble iron salt in the mix, thereafter changing the salt to a colloidal suspension of an hydrated oxide of iron prior to the initial set of the cementitious material of the mix, whereby the peroxide is decomposed and oxygen evolved uniformly throughout the mix producing cellules therein that remain in the material during and after the setting thereof.

9. The process of producing cellular building products from a cementitious mix containing water which comprises incorporating a quantity of a peroxide with the mix, distributing a quantity of a potentially active peroxide decomposing agent substantially uniformly therewith, and 10. The process of producing cellular building products from a cementitious mix containing water which comprises incorporating a quantity of a peroxide with the mix, distributing a quantity of a potentially active peroxide decomposing agent substantially uniformly therewith, and thereafter changing the physical nature of the agent to render the same active.

11. The process of producing cellular building products from a cementitious mix containing water which comprises incorporating a quantity of a peroxide with the mix, distributing a quantity of a potentially active peroxide decomposing agent substantially uniformly therewith, and thereafter changing the chemical and physical nature of the agent to render the same active.

HANS O. KAUFFMANN.